United States Patent
Osgood

(10) Patent No.: US 7,513,183 B2
(45) Date of Patent: Apr. 7, 2009

(54) METAL ROOF PANEL CUTTING SHEARS

(76) Inventor: Mark Osgood, 3272 S. Tallahassee Trail, Canon City, CO (US) 81212

( * ) Notice: Subject to any disclaimer, the term of this patent is extended or adjusted under 35 U.S.C. 154(b) by 145 days.

(21) Appl. No.: 11/465,517

(22) Filed: Aug. 18, 2006

(65) Prior Publication Data

US 2008/0041208 A1   Feb. 21, 2008

(51) Int. Cl.
B26D 5/08 (2006.01)
B26D 1/12 (2006.01)
B26D 1/02 (2006.01)

(52) U.S. Cl. .............................. 83/608; 83/607; 83/920; 83/670; 83/857

(58) Field of Classification Search ............... 83/614, 83/670, 693, 694, 699.11, 699.71, 699.61, 83/857, 858, 920, 607, 608, 581
See application file for complete search history.

(56) References Cited

U.S. PATENT DOCUMENTS

| 285,091 | A | * | 9/1883 | Wilbor | 83/468.7 |
|---|---|---|---|---|---|
| 1,918,104 | A | * | 7/1933 | Hook | 83/468 |
| 1,954,237 | A | * | 4/1934 | Bosworth | 83/468 |
| 2,279,078 | A | * | 4/1942 | Swanson | 83/517 |
| 2,518,076 | A | * | 8/1950 | Scherig | 83/397 |
| 2,588,999 | A | * | 3/1952 | Tucker | 83/387 |
| 3,455,197 | A | * | 7/1969 | Richardson | 83/468.3 |
| 3,996,829 | A | * | 12/1976 | Tromponi | 83/522.22 |
| 4,186,916 | A | * | 2/1980 | Varga | 269/303 |
| 4,387,616 | A | * | 6/1983 | Ireland | 83/608 |
| 4,771,669 | A | * | 9/1988 | Bianchi | 83/468.7 |
| 5,249,495 | A |   | 10/1993 | Renk |   |
| 5,644,963 | A | * | 7/1997 | Fountas | 83/454 |
| 5,775,192 | A | * | 7/1998 | Fuecker et al. | 83/597 |
| 5,996,461 | A | * | 12/1999 | Croft | 83/581 |

* cited by examiner

*Primary Examiner*—Ghassem Alie
*Assistant Examiner*—Bharat C. Patel
(74) *Attorney, Agent, or Firm*—McHale & Slavin, P.A.

(57) ABSTRACT

A metal panel shear cutter is designed for metal panels which include support ribs. The metal panel cutter utilizes an anvil type cutting blade positioned at each side of a cutting base. Each cutting blade is pivotally connected to a cutting base in the vertical plane. The cutting base also includes supports for the ribs of the panels to allow for a smooth and clean cut of the panel. The cutting blades and a small portion of the cutting base are pivotally connected to the cutting base in the horizontal plane so they may be pivoted to the desired cutting angle while the metal panel remains fixed with respect to the base. This pivotal portion of the base includes additional supports for the ribs of the panel. These supports are adjustable to accommodate the various angles at which the panels are to be cut.

10 Claims, 4 Drawing Sheets

METAL ROOF PANEL CUTTING SHEARS

FIELD OF THE INVENTION

This invention relates to a cutter for ribbed sheet metal roof panels and in particular 5-V crimp metal roof panels, or the like. The cutter of the instant invention allows the roof panels to be cut at various angles with respect to their length for installation on various roofs.

BACKGROUND OF THE INVENTION

Whenever a new roof is installed the roofing materials must be cut at various angles, especially during the construction of hip-type roofs and valleys, where two sections of roof join each other. Roofing substrates such as plywood are relatively easy to cut at different angles with saws and the like. Asphalt roofing shingles are also relatively easy to cut at various angles with snips, razor knives and the like. However, sheet metal is oftentimes used for roofing material because of its durability. These sheet metal panels normally include at least one rib, extending along the length thereof to add strength to the panel. Many of the sheet metal roofing panels are approximately 24 inches in width. Conventional metal cutting shears, jig saws, and Sawzalls have not provided a satisfactory method for insuring a clean, smooth accurate cut when used for cutting ribbed metal roofing panels.

DESCRIPTION OF THE PRIOR ART

U.S. Pat. No. 4,387,616 discloses a cutter for ribbed sheet metal building panels. The cutter employs a swingably mounted cutting blade attached to a cutting table. A rigid steel channel mounted to the table works in conjunction with the swingable cutting blade to cut the metal building panels. A plurality of anvil blocks are mounted on the base of the cutter adjacent the cutting blade. These anvil blocks cooperate with the ribs of the building panels to support the ribs and allow for a clean cut of the panel. While a majority of the cuts are orthogonal to the length of the panel, occasionally an oblique angle cut needs to be made. When an oblique angle cut is required the panel is positioned on the cutter such that the proper angle is formed with the cutting blade. In addition, the positions of the anvil blocks on the base are adjustable so that when the panel is cut at an angle the blocks can cooperate with the ribs of the panel to allow for a cut. However, there are no means provided to hold the panel at the correct cutting angle with respect to the cutting base while the cut is being made. In addition, the side surfaces of the anvil blocks do not engage the entire inner surface of each rib so that the ribs are not completely supported during the cut. This can lead to the metal panel bending at the points of nonsupport which will result in wavy, unclean cut. Therefore, what is needed in the art is a cutter for metal panels with ribs that includes provisions to allow the panel to be cut at various angles while the position of the panel remains unchanged on the cutting device. These provisions further include means to completely support the ribs when the panel is cut at an angle and means to hold the panel at the proper cut angle and in alignment with respect to the cutting blade while the cut is made.

U.S. Pat. No. 5,249,495 discloses a cutter for shingles which comprises a base having two end walls and two side walls. An anvil cutter is positioned along one of the side walls. A pivotal fence plate is positioned adjacent an end wall. When a shingle is to be cut it is abutted against the fence plate and after the proper length is determined, it is cut with the anvil cutter. If the shingle needs to be cut at an angle, the fence plate can be pivoted to the proper angle, the shingle placed against the fence plate and thereafter cut. While this cutter can accommodate flat shingles and other material, there is no provision for accommodating material with ribs such as 5V-crimp roofing panels. Therefore what is needed in the art is a cutter for metal panels with ribs that includes provisions to allow the panel to be cut at various angles without changing the position of the panel on the cutting device. The provisions further include a means to completely support the ribs when the panel is cut at an angle and means to hold the panel at the correct cut angle and in alignment with respect to the cutting blade while the cut is made.

SUMMARY OF THE INVENTION

The metal panel shear cutter of the instant invention is designed for metal panels which include support ribs. The panel cutter utilizes an anvil type cutting blade positioned at each side of the cutting base. Each cutting blade is pivotally connected to a cutting base in the vertical plane. The cutting base also includes supports for the ribs of the panels to allow for a smooth and clean cut of the panel. The cutting blades and a small portion of the base are also pivotally connected to the cutting base in the horizontal plane so they may be pivoted to the desired cutting angle while the metal panel remains fixed with respect to the base. This pivotal portion of the base includes additional supports for the ribs of the panel. These supports are adjustable to accommodate the various angles at which the panels are to be cut.

Accordingly, it is an objective of the instant invention to provide a shear cutter for metal panels with ribs which allows the panel to be cut at various angles.

It is a further objective of the instant invention to provide a shear cutter for metal panels which includes supports for the ribs adjacent the cutting blade effective for preventing the panel from bending during cutting and permitting a smooth clean cut.

It is yet another objective of the instant invention to provide a shear cutter for metal panels with ribs wherein a small portion of the base and the cutting blade are pivotally connected to the main base so as to be pivotal to the angle to which the panel is to be cut.

It is a still further objective of the invention to provide a shear metal panel cutter with a cutting blade located at both sides of a cutting base.

It is a still another objective of the invention to provide adjustable supports adjacent each cutting blade constructed and arranged to accommodate the various angles to which the panels are cut.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
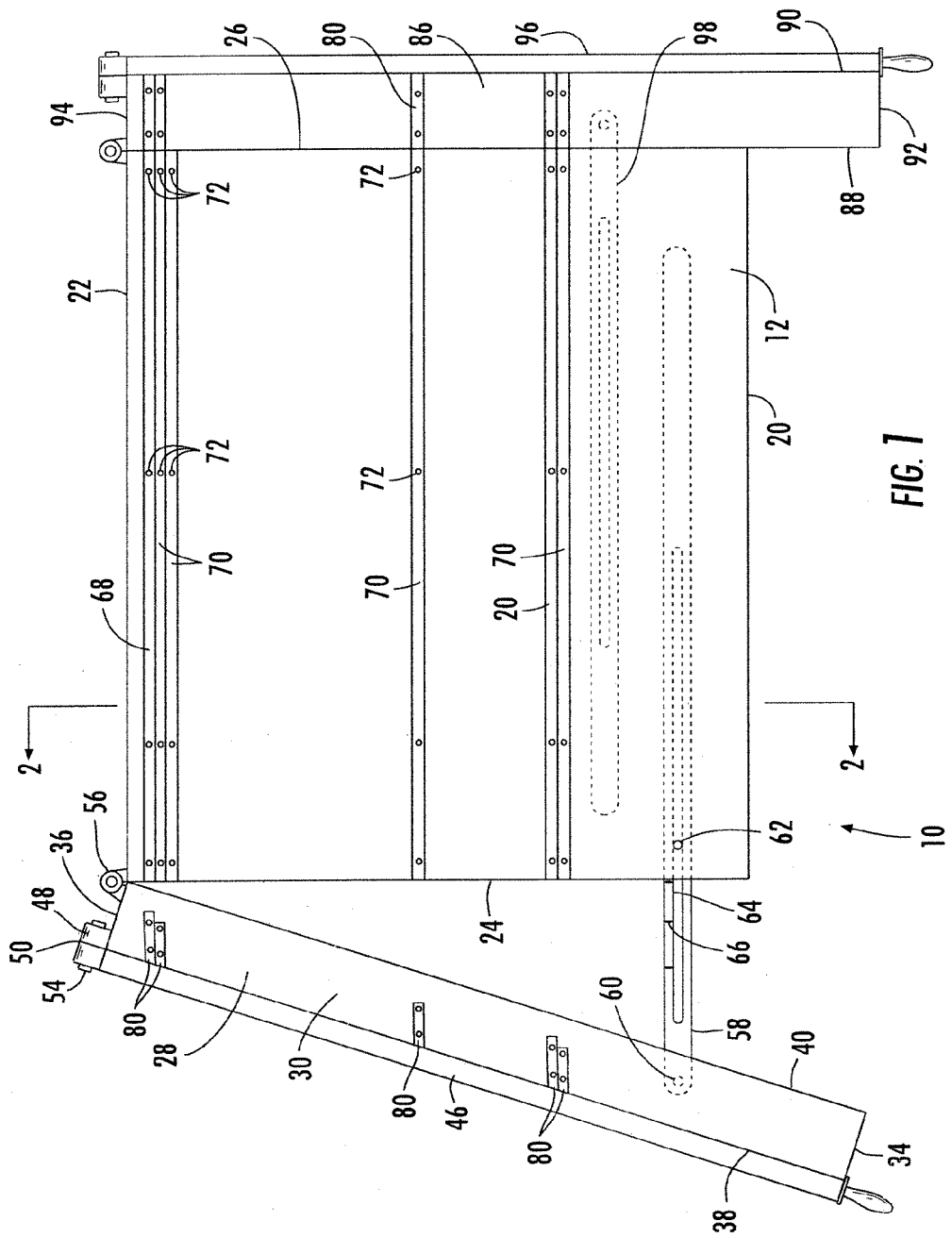
FIG. 1 is a top plan view of the instant invention with one of the cutting blades set to cut a panel at an angle.
Figure 2:
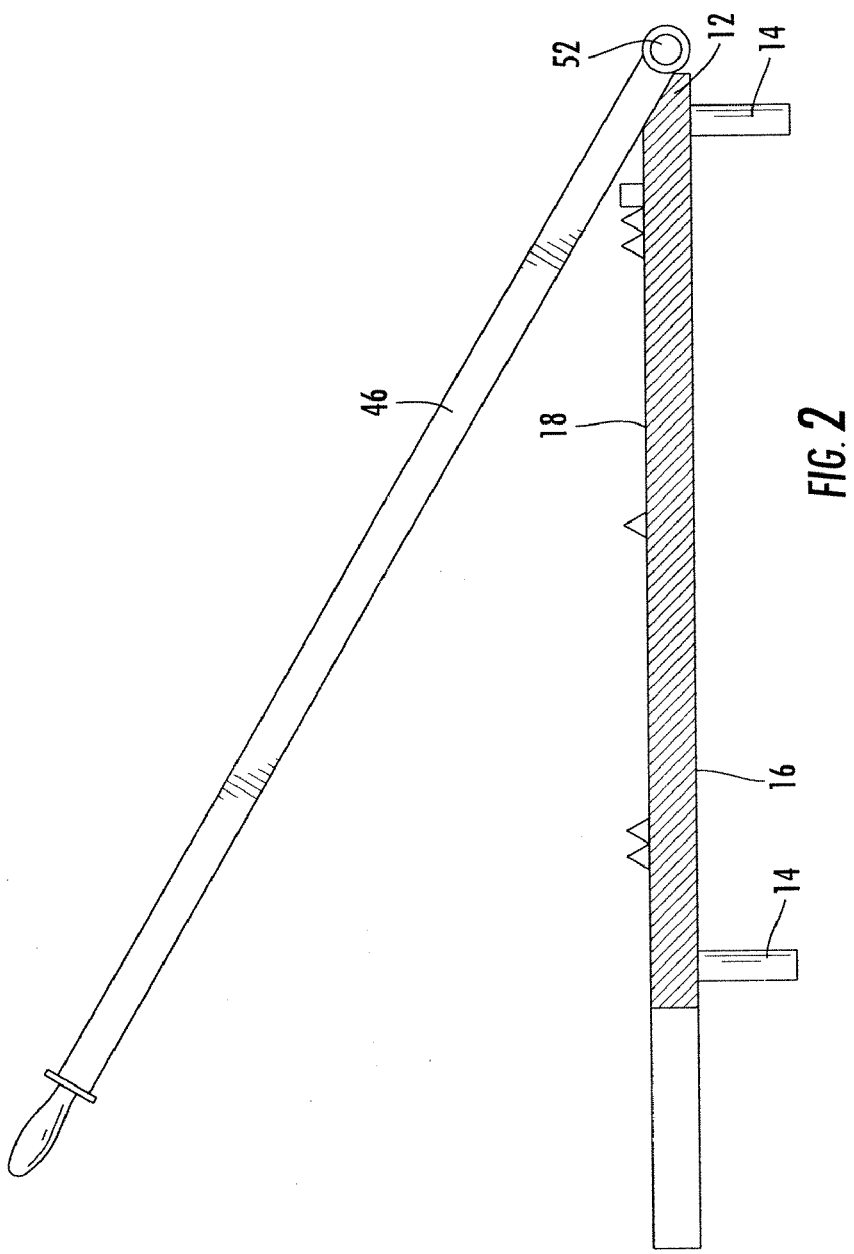
FIG. 2 is a side sectional view taken along line 2-2 of FIG. 1.
Figure 3:
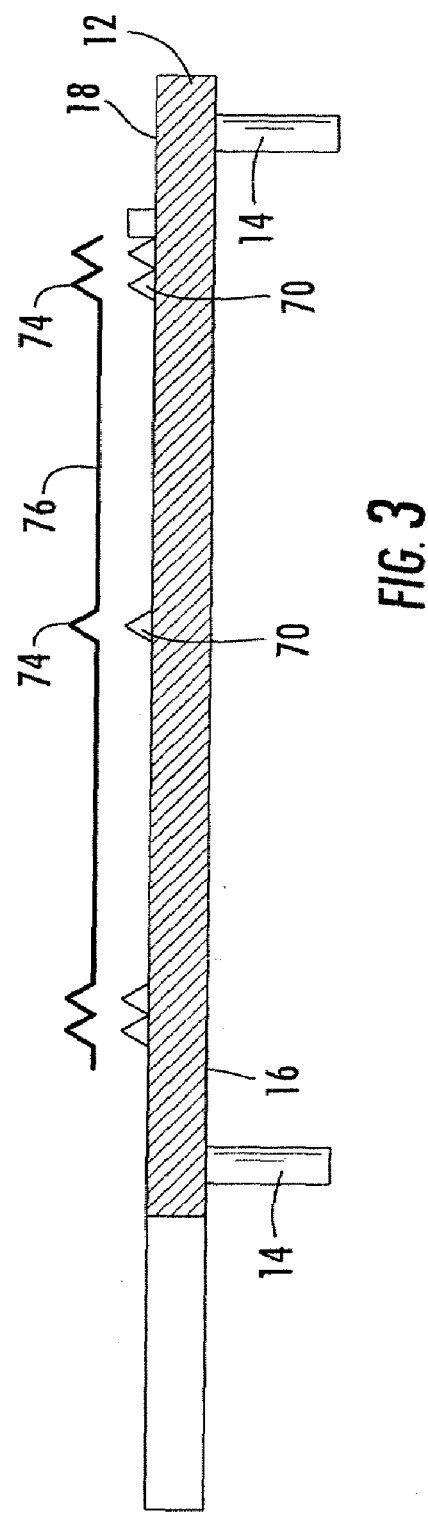
FIG. 3 is a view similar to FIG. 2, with the cutting blade removed, illustrating the relationship of the metal panel and the support members.

With reference to the drawings, and in particular to FIGS. 1-3 thereof, a new and improved metal panel cutting apparatus embodying the principles and concepts of the instant invention and generally designated by the reference numeral 10 will be described.

It is recognized that when roofs are installed the materials which are used must be cut at certain angles whenever a hip roof or a valley between roofs are encountered. The angles at which the elements of the roof meet in the above constructions differ depending on the slope or pitch of the roof. In order to properly cut these angles, especially when metal roofing panels are employed, the cutter of the instant invention has been developed.

Figure 6:
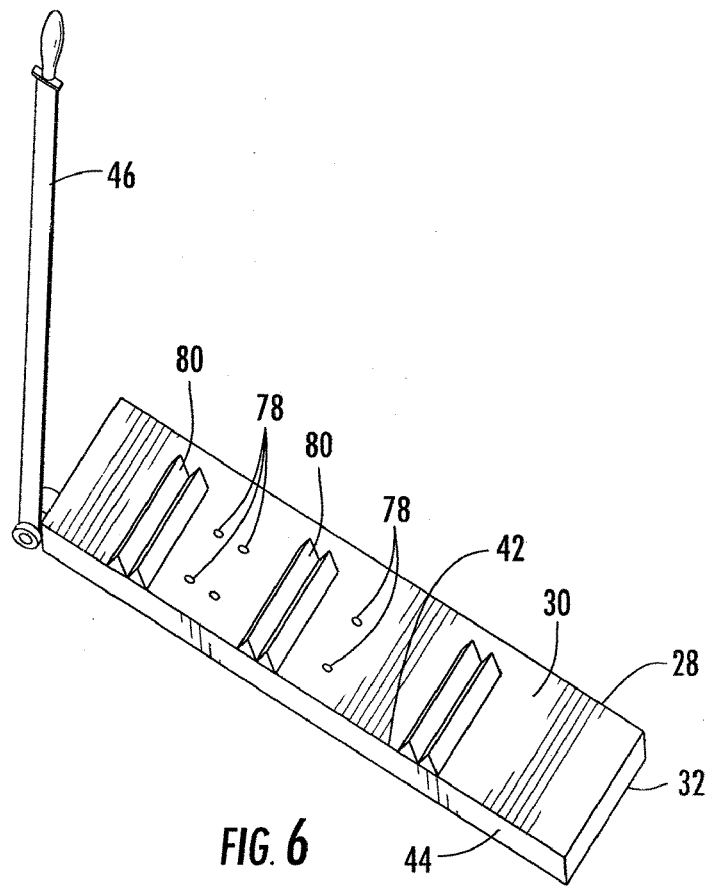
FIG. 6 is a perspective view of a first cutting surface of the instant invention.

The metal panel cutting apparatus 10 of the instant invention comprises an elongate rigid base plate 12. The elongate rigid base plate includes support legs 14, illustrated in FIGS. 2 and 3, attached to a generally planar bottom surface 16. The elongate base plate includes a generally planar top surface 18 which is spaced from and substantially parallel to a bottom surface 16. The elongate base plate further includes a first end wall 20 and a second end wall 22. The second end wall 22 is spaced from and substantially parallel to the first end wall 20. The positions of the first and second end walls can be reversed. The elongate base plate also has a first side wall 24 and a second side wall 26. The second side wall 26 is spaced from and substantially parallel to the first side wall 24. The first and second end walls extend between the first and second side walls. The first and second side walls extend between the first and second end walls. The positions of the first and second side walls can be reversed. A first cutting surface 28 is pivotally attached to the elongate base plate at the top portion thereof as illustrated in FIG. 1. The first cutting surface has a generally planar top surface 30 and a bottom surface 32 which is spaced from and generally parallel to the top surface (FIG. 6). The top surface of the first cutting surface is in substantial planar alignment with the top surface of the elongate base plate whereby when the first cutting surface abuts the elongate base plate the top surfaces thereof essentially form one continuous surface.

The first cutting surface 28 also includes a first end wall 34 and a second end wall 36. The second end wall 36 is spaced from and substantially parallel to the first end wall 34. The positions of the first and second end walls can be reversed. The first cutting surface further includes a first side wall 38 and a second side wall 40. The second side wall 40 is spaced from and substantially parallel to the first side wall 38. The first and second end walls extend between the first and second side walls. The first and second side walls extend between the first and second end walls. The first and second side walls of the first cutting surface are longer than the side walls of the elongate base plate. The positions of the first and second side walls can be reversed. A shear edge 42 is formed along the first side wall 38 of the cutting surface 28. The shear edge may include a strip of metal 44 attached along the first side wall of the cutting surface.

A swingable shear cutter blade 46 may be hingedly mounted on or adjacent to the second end wall 36 of the cutter surface and along the first side wall thereof in a number of ways. In a preferred embodiment, a first portion 48 of the hinged mount 50 is fixedly attached to the second end wall of the cutter surface. An aperture 52 in an end portion of the cutter blade in provided for insertion of a bolt 54 or similar element therethrough which in turn also passes through the first portion of the hinged mount. The movement of the cutter blade with respect to the bolt and the first portion allows for the hinged mounting and swinging action of the cutter blade. A metal panel placed on top of the cutting surface and over the shear edge will be cut by the cutter blade along the shear edge thereof.

The first cutting surface is also pivotally attached to the elongate base plate at the second end walls of the cutting surface and the elongate base plate by pivoting attachment element 56, FIG. 1. This arrangement allows the shear cutter blade and shear edge to be pivoted to the desired angle at which the metal panel is to be cut. An adjustment element is attached to the bottom surfaces of the elongate base plate and the first cutting surface. In a preferred embodiment the adjustment element comprises a slotted bar 58. The slotted bar is pivotally secured at one end thereof by a fastening element 60 to the planar bottom surface of the first cutting surface 28. A second fastening element 62 is attached to the bottom surface of the elongate base plate and also passes through the slot 64 of the bar which allows the bar to be longitudinally moveable with respect to the fastening element. As the bar is moved with respect to the fastening element, the first cutting surface pivots away from and towards the elongate base plate. Once the cutting surface is positioned at the desired angle, the fastening element 62 is tightened thereby securing the bar to the bottom surface of the elongate base plate and locking the cutting surface in position. Spaced along the top surface of the slotted alignment bar are indicia 66 representing the different angles at which the metal panels are to be cut. These indicia eliminate the need to measure the angle of the cutting blade with respect to the elongate base plate. In order to set the cutter to a desired angle, the operator loosens the fastener 62 of the adjustment bar and pivots the cutting surface 28 away from the elongate base plate until the indicia 66 on the bar, corresponding to the desired angle at which the metal panel is to be cut, aligns with the first side wall 24 of the elongate base plate. The fastening element 62 is then tightened, thereby securing the adjustment bar to the bottom surface of the elongate base plate.

Attached to the top surface of the elongate base plate are a stop fence 68 and a plurality of alignment elements 70. The stop fence 68 is generally square or rectangular in cross section and preferably attached to the elongate base plate adjacent the second end wall 22. The stop fence can also be any other shape in cross section. In a preferred, albeit non-limiting embodiment the alignment elements 70 are adjustably positioned on the elongate base plate to accommodate different size metal panels. Each of the alignment elements has a number of pins 72 fixedly attached thereto. The top surface of the elongate base plate is provided with a plurality of holes to accommodate the pins. With this arrangement the alignment elements can be moved toward and away from the stop fence on the elongate base plate. Also, the number of alignment elements on the base plate can be changed. As can be seen in FIG. 3 the alignment elements 70 are positioned on elongate base plate 12 so as to be in alignment with the ribs 74 of the metal panels 76. This arrangement helps to securely hold the metal panels and prevent them from shifting during the cutting process. The alignment elements are also preferably, generally triangular in cross section, corresponding to the generally triangular support ribs of the metal panels, as illustrated in FIG. 3 but may be any other shape. The cross sectional shape of the alignment elements preferably corresponds to the shape of the ribs of the metal panels.

Figure 4:
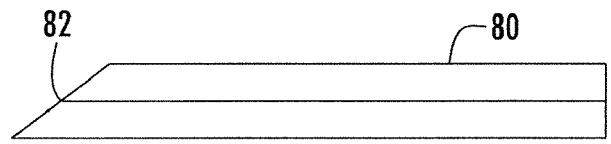
FIG. 4 is a top plan view of an alignment element utilized on a cutting surface.
Figure 5:
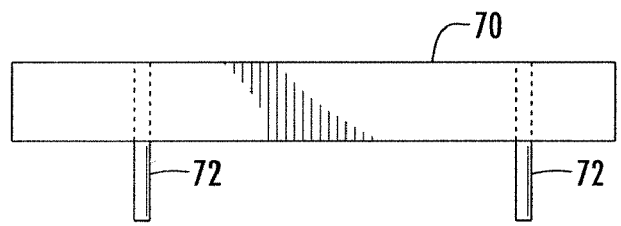
FIG. 5 is a front view in elevation of the alignment element of FIG. 4.

The top surface of the elongate base plate is provided with a plurality of holes 78 for the reception of the pins 72 of the alignment elements 70. The top surface 30 of the cutting surface 28 is also provided with a plurality of holes 78 for the reception of the pins 72 of additional alignment elements 80. The additional alignment elements 80 are readily interchangeable and are provided with an angular end 82 as illustrated in FIG. 4. The angle of the end portion of the additional alignment 80 corresponds to the angle at which the metal panel is to be cut. This enables placement of the additional alignment element 80 on the cutting surface and maintaining alignment with a corresponding alignment element 70 on the elongate base plate. The alignment of these corresponding members enable each rib of the metal panel to be maintained aligned with respect to each other so that the metal panel is held in a constant horizontal plane during the cutting operation. This prevents twisting of the metal panel and therefore allows for the correct cut each and every time.

A second cutting surface 86 is attached to the opposite side of the elongate base plate adjacent side wall 26. The second cutting surface is a mirror image of the first cutting surface 28. The second cutting surface has a first side wall 88, a second side wall 90, a first end wall 92 and a second end wall 94. The positions of the first and second side walls can be reversed. Also, the positions of the first and second end walls can be reversed. A second swingable shear cutter blade 96 is hingedly mounted on or adjacent to the second end wall 94 of the cutter surface and along the second side wall thereof. A plurality of additional alignment elements 80 are mounted on the top surface of the second cutting surface. These elements 80 function in the same manner as the additional alignments 80 on the first cutting surface. The second cutting surface is also provided with a second slotted adjustment bar 98 which functions in the same manner as the slotted alignment bar 58 of the first cutting surface.

Providing a metal panel cutter with a pivotal cutting surface at each end thereof allows two different metal roof panels which will abut each other, in a roof valley or on a hip roof, to be cut to the correct angles without having to flip the panels over or make any other adjustments. One of the metal roof panels is cut at one end, the left end for example, with the first pivotal cutting surface 28 on the left side on the cutting device. The other metal roof panel is cut at its opposite end, the right end for example, with the second pivotal cutting surface 86 on the right side of the cutting device.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cutter for sheet metal panels comprising:
   an elongate base plate adapted to maintain a ribbed sheet metal panel in a fixed position relative to said elongate base;
   said elongate base plate having a first base plate end wall spaced from a second base plate end wall;
   a first base plate side wall extending between said first base plate end wall and said second base plate end wall;
   a second base plate side wall spaced from said first base plate side wall and extending between said first base plate end wall and said second base plate end wall;
   a first cutting surface;
   said first cutting surface having a first cutting surface end wall spaced from a second cutting surface end wall;
   a first cutting surface side wall extending between said first cutting surface end wall and said second cutting surface end wall;
   a second cutting surface side wall spaced from said first cutting surface side wall and extending between said first cutting surface end wall and said second cutting surface end wall;
   a shear edge along said first cutting surface side wall of said first cutting surface;
   said elongate base plate and said first cutting surface being coplanar;
   said first cutting surface being pivotally connected to said elongate base plate at a junction of said second base plate end wall and said first base plate side wall;
   a shear cutting blade hingedly connected to said first cutting surface adjacent said shear edge;
   said shear blade and said shear edge cooperating to cut a metal panel placed thereon;
   whereby said first cutting surface can be pivoted with respect to said elongate base plate such that a sheet metal panel on said main portion of said elongate base table can be cut at an angle with respect to the longitudinal axis of the sheet metal panel.

2. The cutter of claim 1 further including alignment elements attached to an upper surface of said elongate base plate and said first cutting surface;
   said alignment elements being readily removably attached to said first cutting surface;
   whereby when selected alignment elements are placed on said first cutting surface said selected alignment elements are in alignment with corresponding alignment elements on said elongate base plate when said first cutting surface is pivoted with respect to said elongate base plate to selected positions.

3. The cutter of claim 1 further comprising said elongate base plate having a second cutting surface;
   said second cutting surface having a first cutting surface end wall spaced from a second cutting surface end wall;
   a first cutting surface side wall extending between said first cutting surface end wall and said second cutting surface end wall;

a second cutting surface side wall spaced from said first cutting surface side wall and extending between said first cutting surface end wall and said second cutting surface end wall;

a second shear edge along said second cutting surface side wall of said second cutting surface;

said second cutting surface being pivotally connected to said elongate base plate;

a second shear blade hingedly connected to said second cutting surface adjacent said second shear edge;

said shear blade and said shear edge cooperating to cut a metal panel placed thereon;

whereby said second cutting surface can be pivoted with respect to said elongate base plate such that a sheet metal panel on said elongate base plate can be cut at an angle with respect to the longitudinal axis of the sheet metal panel.

4. The cutter of claim 3 further including alignment elements attached to an upper surface of elongate base plate and said second cutting surface;

said alignment elements being readily removably attached to said second cutting surface;

whereby selected alignment elements can be placed on said second cutting surface such that said selected alignments elements are in alignment with corresponding alignment elements on said elongate base plate when said second cutting surface is pivoted to selected positions.

5. The cutter of claim 2 wherein said selected alignment elements attached to said first cutting surface are selected based on different angles that said first cutting surface forms with said elongate base plate after being pivoted away therefrom.

6. The cutter of claim 4 wherein said selected alignment elements attached to said second cutting surface are selected based on different angles that said second cutting surface forms with said elongate base plate after being pivoted away therefrom.

7. The cutter of claim 1 further comprising an adjustment element connected to said elongate base plate and said first cutting surface;

indicators on said adjustment element enabling positioning of said first cutting surface with respect to said elongate base to enable cutting of a metal panel at a desired angle.

8. The cutter of claim 2 wherein said selected alignment elements include a front face which lies flush with said first shear edge; said alignment elements conforming to the shape of the ribs of a sheet metal panel whereby said front face and the shape of said alignment elements cooperate with said elongate shear blade to cut the ribs of a ribbed metal panel placed on the cutter.

9. The cutter of claim 3 further comprising an adjustment element connected to said elongate base plate and said second cutting surface;

indicators on said adjustment element enabling positioning of said second cutting surface with respect to said elongate base to enable cutting of a metal panel at a desired angle.

10. The cutter of claim 4 wherein said selected alignment elements include a front face which lies flush with said first shear edge; said alignment elements conforming to the shape of the ribs of a sheet metal panel whereby said front face and the shape of said alignment elements cooperate with said elongate shear blade to cut the ribs of a ribbed metal panel placed on the cutter.

* * * * *